United States Patent
Bang et al.

(10) Patent No.: US 10,204,265 B2
(45) Date of Patent: Feb. 12, 2019

(54) SYSTEM AND METHOD FOR AUTHENTICATING USER

(71) Applicant: Electronics and Telecommunications Research Institute, Daejeon (KR)

(72) Inventors: Jun Seong Bang, Daejeon (KR); Dong Chun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 80 days.

(21) Appl. No.: 15/403,293

(22) Filed: Jan. 11, 2017

(65) Prior Publication Data

US 2017/0200046 A1    Jul. 13, 2017

(30) Foreign Application Priority Data

Jan. 11, 2016 (KR) .................. 10-2016-0003397
Jul. 21, 2016 (KR) .................. 10-2016-0092537

(51) Int. Cl.
*G06K 9/00* (2006.01)
*H04L 29/06* (2006.01)
(Continued)

(52) U.S. Cl.
CPC ......... *G06K 9/00355* (2013.01); *G06F 21/31* (2013.01); *H04L 63/0861* (2013.01); *H04W 12/06* (2013.01)

(58) Field of Classification Search
CPC .............. G06F 21/32; G06F 21/6209; G06F 2221/2149; G06F 3/017; G06F 21/31; G06F 3/01; G06F 21/36; G06F 3/048; G06F 1/163; G06F 21/34; G06F 2221/2153; G06F 3/015; G06F 9/542; G06F 17/30917; G06F 21/575; G06F 21/72; G06F 3/0304; H04L 2209/805; H04L 9/3231; H04L 63/0861; G06K 9/00087; G06K 9/00355;
(Continued)

(56) References Cited

U.S. PATENT DOCUMENTS 8,254,647 B1 *  8/2012  Nechyba ............ G06K 9/00248
                                                   382/118
8,296,574 B2 * 10/2012  Kosaka ................... G06F 21/32
                                                   713/186
(Continued)

FOREIGN PATENT DOCUMENTS

KR    10-2011-0121251 A    11/2011
KR    10-2013-0093757 A     8/2013
KR    10-2016-0007342 A     1/2016

*Primary Examiner* — Aklilu K Woldemariam
(74) *Attorney, Agent, or Firm* — NSIP Law (57) ABSTRACT

Provided is a user authentication method using a natural gesture input. The user authentication method includes recognizing a plurality of natural gesture inputs from image data of a user, determining number of the plurality of natural gesture inputs as total number of authentication steps, determining a reference ratio representing a ratio of number of authentication steps requiring authentication pass to the total number of the authentication steps, determining an actual ratio representing a ratio of number of authentication steps, where authentication has actually passed, to the total number of the authentication steps, and performing authentication on the user, based on a result obtained by comparing the actual ratio and the reference ratio.

21 Claims, 10 Drawing Sheets

(51) Int. Cl.
*G06F 21/31* (2013.01)
*H04W 12/06* (2009.01)

(58) Field of Classification Search
CPC .......... G06K 9/00335; G06K 9/00597; G06K
9/00013; G06K 9/00912; G06K 9/32;
G06K 9/6293; G06K 9/00006; G06K
9/00973; H01L 2924/0002; H01L
2924/00; H01L 2223/54433; H01L
2223/5444; H01L 2223/54473; H01L
23/544; H01L 23/576; H04W 12/06;
H04W 4/00; H04W 88/02; G06N 7/00;
G09G 3/00; H04N 5/23212; H04N
5/23219; H04N 5/23248; H04N 5/23274;
H04N 5/2351
USPC ....... 382/103; 713/183, 186; 726/17, 18, 19,
726/28, 29
See application file for complete search history.

(56) References Cited

U.S. PATENT DOCUMENTS

| | | | |
|---|---|---|---|
| 9,633,652 B2* | 4/2017 | Kurniawati | G10L 15/144 |
| 2006/0136846 A1 | 6/2006 | Im et al. | |
| 2007/0194882 A1* | 8/2007 | Yokota | G06F 21/34 340/5.61 |
| 2010/0277411 A1* | 11/2010 | Yee | G06F 3/017 345/156 |
| 2011/0138459 A1 | 6/2011 | Bae et al. | |
| 2012/0290526 A1* | 11/2012 | Gupta | G06N 7/00 706/52 |
| 2014/0020089 A1* | 1/2014 | Perini, II | G06F 21/32 726/19 |
| 2014/0309868 A1* | 10/2014 | Ricci | G06K 9/00355 701/36 |
| 2015/0084859 A1* | 3/2015 | Itzhaik | G06F 3/017 345/156 |
| 2015/0161836 A1* | 6/2015 | Park | G07C 9/00134 340/5.51 |
| 2015/0268732 A1* | 9/2015 | Walline | G06F 3/017 345/156 |
| 2016/0078207 A1* | 3/2016 | Na | G06F 21/36 726/19 |
| 2016/0142407 A1* | 5/2016 | Chun | H04L 63/0861 726/5 |
| 2016/0171280 A1* | 6/2016 | Han | G06K 9/00067 348/77 |
| 2016/0210602 A1* | 7/2016 | Siddique | G06Q 20/0453 |
| 2016/0357808 A1* | 12/2016 | Morris | G06F 9/453 |
| 2017/0011210 A1* | 1/2017 | Cheong | H04W 12/06 |

* cited by examiner

SYSTEM AND METHOD FOR AUTHENTICATING USER

CROSS-REFERENCE TO RELATED APPLICATIONS

This application claims priority under 35 U.S.C. § 119 to Korean Patent Application No. 10-2016-0003397, filed on Jan. 11, 2016 and Korean Patent Application No. 10-2016-0092537, filed on, Jul. 21, 2016, the disclosure of which is incorporated herein by reference in its entirety.

TECHNICAL FIELD

The present invention relates to a user authentication system and method, and more particularly, to a user authentication system and method using an input based on a natural gesture of a user.

BACKGROUND

A user interface (UI) denotes an intermediate medium that enables communication between a user and a computer system (a hardware device or a software program).

The UI has advanced a general UI, which recognizes a button type-based input and a touch type-based input, into a natural UI (NUI) that recognizes an input based on a natural gesture of a user.

With the advance of image processing technology for recognizing and tracing an object included in an image, the usability of a natural gesture as an input means is expected to increase, and particularly, in the field of augmented reality (AR) technology, virtual reality (VR) technology, or mixed reality (MR) technology, the usability of a natural gesture as an input means is expected to be very large.

As described above, since the usability of a natural gesture-based input through an NUI is expected to increase, it is required to develop a user authentication system for determining how to perform a user authentication on a natural gesture-based input. However, research and development of a user authentication system for a natural gesture-based input are still insufficient.

SUMMARY

Accordingly, the present invention provides a user authentication system and method using a natural gesture input.

In one general aspect, a user authentication method includes: recognizing a plurality of natural gesture inputs from image data of a user; determining number of the plurality of natural gesture inputs as total number of authentication steps; determining a reference ratio representing a ratio of number of authentication steps requiring authentication pass to the total number of the authentication steps; determining an actual ratio representing a ratio of number of authentication steps, where authentication has actually passed, to the total number of the authentication steps; and performing authentication on the user, based on a result obtained by comparing the actual ratio and the reference ratio.

In another general aspect, a user authentication method includes: recognizing a plurality of natural gesture inputs from image data of a user; allocating a weight value to an authentication step for each of the plurality of natural gesture inputs; applying the weight value to a status value representing whether authentication actually passes for each of authentication steps; summating status values to which the weight value is applied for each authentication step; and determining whether to authenticate the user, based on a sum value obtained by summating the status values.

In another general aspect, a user authentication system includes: a gesture recognition module configured to recognize a plurality of natural gesture inputs from image data of a user; and a natural gesture authentication processing unit configured to determine number of the plurality of natural gesture inputs as total number of authentication steps and perform authentication on the user by using a reference ratio, representing a ratio of number of authentication steps requiring authentication pass to the total number of the authentication steps, and a weight value allocated to each of authentication steps.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter.

However, the present invention may be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A user authentication system according to an embodiment of the present invention may perform an authentication operation on a natural gesture-based input. A button or touch type input applied to a conventional UI enables the same inputs to be completely reproduced at different times, and thus, is close to a digital type input.

On the other hand, a natural gesture-based input is an input based on an actual action of a person, and thus, is close to an analog type input. This denotes that in the natural gesture-based input, the same inputs cannot be completely reproduced at different times.

In this regard, in a natural gesture-based UI, a recognition fail rate of a natural gesture is high, and for this reason, causes a high authentication fail rate in an operation of performing authentication on a natural gesture-based input.

Therefore, in embodiments of the present invention, by performing authentication on a natural gesture-based input according to an efficient user authentication policy, a user authentication system where an authentication fail rate is reduced is provided.

The user authentication system may be applied to electronic devices used in various technology fields.

According to some embodiments, examples of the electronic devices may include at least one of a smartphone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to some embodiments, examples of the electronic devices may include at least one of a smart home appliance including an image display function. The smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to some embodiments, examples of the electronic devices may include at least one of a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, an automation teller's machine (ATM), a point of sales (POS), and/or the like.

According to some embodiments, examples of the electronic devices may include at least one of furniture, part of a building/structure, an electronic board, electronic signature receiving device, a projector, various measuring devices (e.g., water, electricity, gas or electro-magnetic wave measuring devices), and/or the like that include an image display function.

The electronic devices may be any combination of the foregoing devices. Also, the electronic devices may be a flexible device. In addition, it will be apparent to one having ordinary skill in the art that the electronic device according to various exemplary embodiments of the present disclosure is not limited to the foregoing devices.

If the user authentication system according to an embodiment of the present invention is applied to the above-listed electronic devices, at least some elements of the user authentication system may be implemented as one module. Hereinafter, the module may be referred to as a user authentication module.

Figure 1:
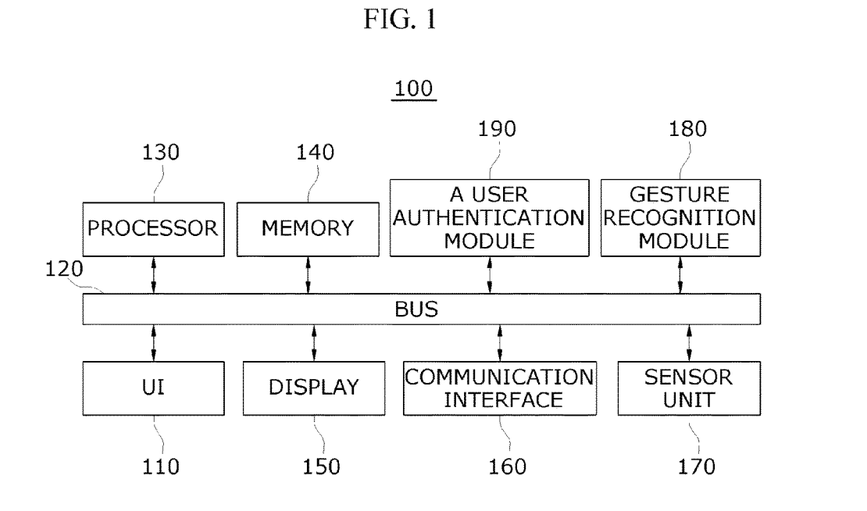
FIG. 1 is a block diagram of an electronic device with a built-in user authentication system according to an embodiment of the present invention.

FIG. 1 is a block diagram of an electronic device 100 with a built-in user authentication system according to an embodiment of the present invention.

Referring to FIG. 1, the electronic device 100 according to an embodiment of the present invention may include a UI 110, a bus 120, a processor 130, a memory 140, a display 150, a communication interface 160, a sensor unit 170, and a gesture recognition module 180.

The UI 110 may provide a non-natural gesture-based input (command or data), input from a user through an input/output (I/O) means such as a keyboard, a keypad, or a touch screen, to the processor 130, the memory 140, the communication interface 160, the gesture recognition module 180, or a user authentication module 190 through the bus 120. For example, the UI 110 may provide input data, generated from a result of a user touch which is input through a touch screen, to the processor 130. Also, for example, the UI 110 may output through the I/O means (for example, a speaker or a display) a command or data received through the bus 120 from the processor 130, the memory 140, the communication interface 160, or the gesture recognition module 180. For example, the UI 110 may output voice data, obtained through processing by the processor 130, to a user through the speaker.

The bus 120 may connect the above-described elements 110, 130, 140, 150, 160, and 170 so as to enable communication therebetween.

The processor 130, for example, may receive a command through the bus 120 from at least one of the other elements 110, 140, 150, 160, 170, 180, and 190, decode the received command, and perform an arithmetic operation or data processing on the decoded command. Here, the data processing may be a series of processing operation of detecting and tracing an object from image data. The processor 130 may be a central processing unit (CPU), a graphic processing unit (GPU), or a combination thereof.

The memory 140 may store a command or data which is received from the processor 130 or at least one of the other elements 110, 140, 150, 160, 170, 180, and 190 or is generated by the processor 130 or at least one of the other elements 110, 140, 150, 160, 170, 180, and 190. Also, the memory 140 may provide a space which enables execution of programming modules such as a kernel 141, a middleware 143, an application programming interface (API) 145, and an application 147 for example. Also, the memory 140 may store a user authentication policy for improving an authentication fail rate of a natural gesture-based input. The user authentication policy will be described below in detail, and may include at least one of a policy of configuring a user input including a natural gesture input and a non-natural gesture input based on a plurality of authentication steps, a policy of determining the number of authentication steps requiring authentication pass from among the total number of authentication steps, a policy of allocating a weight value to each of the authentication steps, and a policy of changing the order of authentication steps.

Moreover, the memory 140 may store the kernel 141, the middleware 143, the API 145, and the application 147. The kernel 141 may control or manage system resources of the electronic device 100. The middleware 143 may relay data so that the API 145 or the application 147 communicates with the kernel 141 to exchange the data. The API 145 may be an interface for allowing the application 147 to control a function provided from the kernel 141 or the middleware 143, and for example, may include at least one interface or function (for example, command) for file control, window control, image processing, letter control, and/or the like. The application 147 may be software which is installed and executed for performing a specific operation in an operating system (OS) of a mobile terminal or an OS of a desktop computer, and for example, may include all kinds of applications including an application for movie reproduction, an application for game execution, an application for music execution, an application for shopping, and/or the like.

The display 150 may display various pieces of information such as multimedia data, text data, etc. The display 150 may display an authentication result of a user input, including a natural gesture input and a non-natural gesture input which are input from a user, as information such as multimedia data, text data, and/or the like.

The communication interface 160 may connect communication between the electronic device 100 and an external device (for example, another electronic device or a server). For example, the communication interface 160 may be connected to a network (for example, a computer network, Internet, Internet of things, telephone network, or the like) through wireless communication or wired communication to communicate with the external device. The wireless communication may include at least one of, for example, wireless fidelity (Wi-Fi), Bluetooth, near field communication (NFC), global positioning system (GPS), and cellular communication (for example, LTE, LTE-A, CDMA, WCDMA, UMTS, WiBro, or GSM). The wired communication may include at least one of, for example, universal serial bus (USB), high definition multimedia interface (HDMI), recommended standard 232 (RS-232), and plain old telephone service (POTS).

The sensor unit 170 may detect and trace a body of the user or an object such as a worn item worn on the body of the user, and for example, may include a camera, a depth camera, a stereo camera, an infrared sensor, an ultrasonic sensor, and/or the like. In this case, the sensor unit 170 may obtain a result, obtained by sensing a natural gesture of the user, as image data including an RGB image, a gray image, an infrared image, an ultrasonic image, and/or the like.

The gesture recognition module 180 may extract an object and a motion of an object from the image data obtained by the sensor unit 170 and may analyze the extracted object and the extracted motion of the object to recognize a natural gesture input. The object and the motion of the object may be extracted by an image processing algorithm such as an object extraction algorithm or the like.

The object may include user body features such as, for example, a hand gesture, a finger gesture, a head gesture, a palm line gesture, a foot gesture, a skin color, a knuckle line, a skin nevus gesture, and/or the like of the user.

The motion of the object may include, for example, a body action where hands, fingers, feet, head, and/or the like move(s) in an arbitrary direction, an input action where at least one of keys including numbers, letters, and special characters is input by an input tool such as a finger, and a movement of an input tool for drawing a specific pattern. In the present embodiment, the NUI may include the sensor unit 170 and the gesture recognition module 180, and in this case, the user authentication system may include the NUI and the below-described user authentication module 190.

The user authentication module 190 may perform an authentication operation on at least one of non-gesture inputs recognized by the UI 110 and natural gesture inputs recognized by the gesture recognition module 180, based on the user authentication policy.

Figure 2:
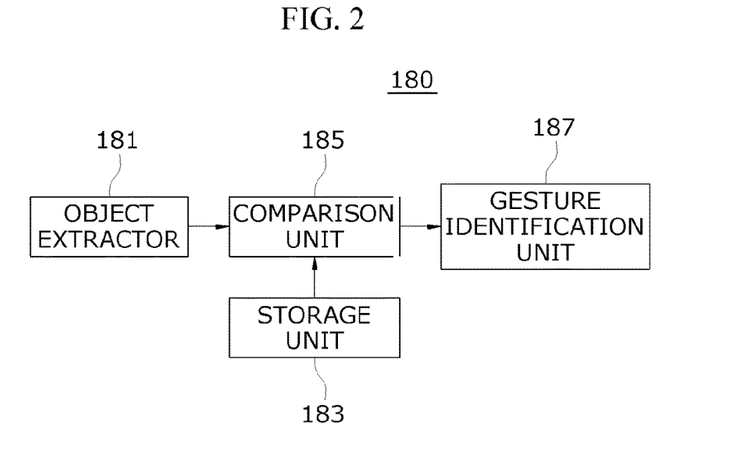
FIG. 2 is a block diagram schematically illustrating an internal configuration of a gesture recognition module illustrated in FIG. 1.

FIG. 2 is a block diagram schematically illustrating an internal configuration of the gesture recognition module 180 illustrated in FIG. 1.

Referring to FIG. 2, the gesture recognition module 180 according to an embodiment of the present invention may be a hardware module, a software module, or a combination thereof controlled by the processor 130 (see FIG. 1).

The gesture recognition module 180 may include an object extractor 181, a storage unit 183, a comparison unit 185, and a gesture identification unit 187, for recognizing a natural gesture.

When a natural gesture of a user is made, the object extractor 181 may extract an object and a vector value, representing a motion, such as a position, a moving distance, and a moving direction of the object, from image data.

The storage unit 183 may store a plurality of natural gesture vector values compared with the object extracted by the object extractor 181, for recognizing a natural gesture. The natural gesture vector values may be previously defined, and the storage unit 185 may provide the natural gesture vector values to the comparison unit 183 according to a request of the comparison unit 183.

The comparison unit 185 may compare the plurality of natural gesture vector values provided from the storage unit 183 with the vector value of the object extracted by the object extractor 181, and when an arbitrary natural gesture vector value matching the vector value of the extracted object is searched for from among the plurality of natural gesture vector values, the comparison unit 185 may recognize the vector value of the extracted object as a natural gesture defined in the arbitrary natural gesture vector value.

In sensing a natural gesture of a user, the gesture recognition module 180 may detect an object (for example, a finger, hand, or foot of the user, a stylus pen, or the like) which is a target of a motion, and may sense a motion of the object. In sensing the motion of the object, the gesture recognition module 180 may sense an x-axis motion, a y-axis motion, and a z-axis motion which corresponds to a depth. That is, in sensing the motion of the object, the gesture recognition module 180 may extract a vector value (x, y, z) of the motion. The vector value may include at least one phase value. The gesture recognition module 180 may compare motion information, obtained by accumulating the extracted vector value (x, y, z) in unit of one frame, with predefined motion (which is stored in a three-dimensional form (x, y, z)) information. In detail, the gesture recognition module 180 may compare a distribution of vector values of the predefined motion with a distribution of vector values of a natural gesture. Also, the gesture recognition module 180 may compare a traveling direction, in which the vector values of the predefined motion are generated, with a traveling direction in which the vector values of the natural gesture are generated.

The gesture identification unit 187 may identify types of natural gestures, based on a recognition result of the natural gesture by the comparison unit 185 and may provide identified natural gesture-based inputs to the user authentication module 190.

Figure 3:
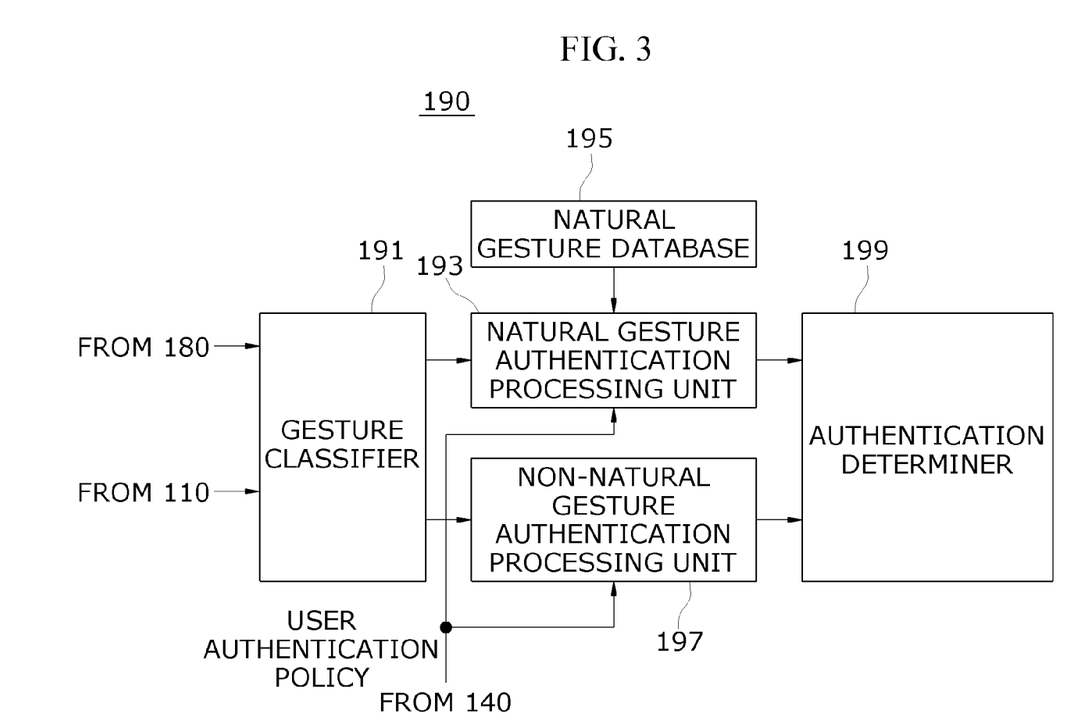
FIG. 3 is a block diagram schematically illustrating an internal configuration of a user authentication module illustrated in FIG. 1.

FIG. 3 is a block diagram schematically illustrating an internal configuration of the user authentication module 190 illustrated in FIG. 1.

Referring to FIG. 3, the user authentication module 190 according to an embodiment of the present invention may perform an authentication operation on a user who attempts to access a specific system or a specific program in the electronic device 100 by using a natural gesture input and a non-natural gesture input.

The user authentication module 190 may perform the authentication operation on the user according to a user authentication policy where a plurality of authentication steps are fundamentally based on non-natural gesture inputs and natural gesture inputs.

To this end, the user authentication module 190 may include a gesture classifier 191, a natural gesture authentication processing unit 193, a natural gesture database 195, a non-natural gesture authentication processing unit 197, and an authentication determiner 199.

The gesture classifier 191 may collect user inputs which are input from a user database 110 and the gesture recognition module 180, and may classify the collected user inputs into non-natural gesture inputs and natural gesture inputs.

Subsequently, the gesture classifier 191 may provide the classified natural gesture inputs to the natural gesture authentication processing unit 193 and may provide the classified non-natural gesture inputs to the non-natural gesture authentication processing unit 197.

The natural gesture authentication processing unit 193 may perform an authentication operation on each of natural gesture-based inputs (hereinafter referred to as natural gesture inputs) according to a user authentication policy based on a plurality of authentication steps.

The gesture database 195 may store a natural gesture input set for processing an authentication steps. The natural gesture input set may be previously set by a user who attempts to access a specific system or a specific program in the electronic device 100, in order to identify whether the user is an authorized user.

The non-natural gesture authentication processing unit 197 may perform an authentication operation on each of non-natural gesture-based inputs (hereinafter referred to as non-natural gesture inputs) according to the user authentication policy based on the plurality of authentication steps. Here, for example, the non-natural gesture inputs may be inputs based on an input action of touching an actual keypad (or an actual keyboard) or a keypad displayed on an actual screen.

The authentication determiner 199 may overall check a user authentication result (hereinafter referred to as a first user authentication result) obtained through processing by the natural gesture authentication processing unit 193 and a user authentication result (hereinafter referred to as a second user authentication result) obtained through processing by the non-natural gesture authentication processing unit 197 to finally process authentication on a user who has input a natural gesture input and a non-natural gesture input. For example, when the first and second user authentication results are all determined as a pass, the authentication determiner 199 may assign an access authority, which permits the overall use of a system or a program, to the user, but when the first and second user authentication results are all determined as a fail, the authentication determiner 199 may block an access of the user to the system or the program. Also, when only one of the first and second user authentication results is determined as a fail, the authentication determiner 199 may assign an access authority, which limits the overall use of the system or the program, to the user.

FIGS. 4 to 8 are diagrams schematically illustrating examples of natural gesture inputs recognized by the gesture recognition module illustrated in FIGS. 1 and 2.

Natural gesture inputs recognized by the gesture recognition module may include an input including feature information about an object and an input including a motion (motion information) of the object.

Figure 4:
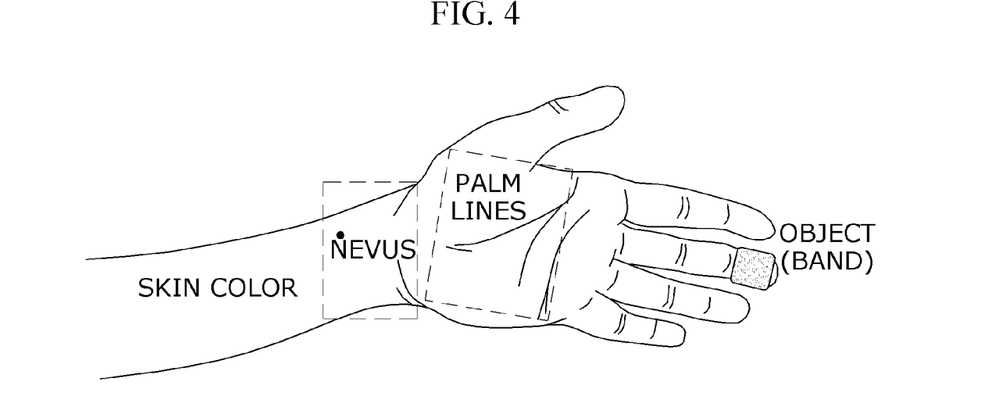
FIGS. 4 to 8 are diagrams illustrating examples of natural gesture inputs available to user authentication according to an embodiment of the present invention.

Referring to FIG. 4, for example, the feature information about the object may include pieces of information indicating body features of the user including a hand gesture, a finger gesture, a palm line gesture, a user skin color, a knuckle line, a user skin nevus gesture, and a worn item such as a band put on a fingertip. In addition, the feature information about the object may be used as information indicating a body feature such as a color of hair, a scar, and/or the like.

The input including the motion of the object may include motion information about a part of a body, motion information about an input tool for inputting a specific pattern or a signature to a virtual input area which is set in air or an actual plane (a desk, a notebook, a palm, a wrist, or the like), and motion information about an input tool for inputting a key including a number and a letter to the virtual input area.

The motion information about the part of the body, for example, may include all information, obtained by recognizing a body action which only the user remembers for user authentication, such as information obtained by recognizing a body action of the user which makes a right arm and a left arm in an X form, information obtained by recognizing a body action of the user which shakes at least one of the right arm and the left arm in a specific direction a plurality of predetermined times, information obtained by recognizing a body action of the user which repeats in a state of opening or closing a hand a plurality of predetermined times, and information obtained by recognizing a body action of the user which makes a finger in a specific form.

Figure 5:
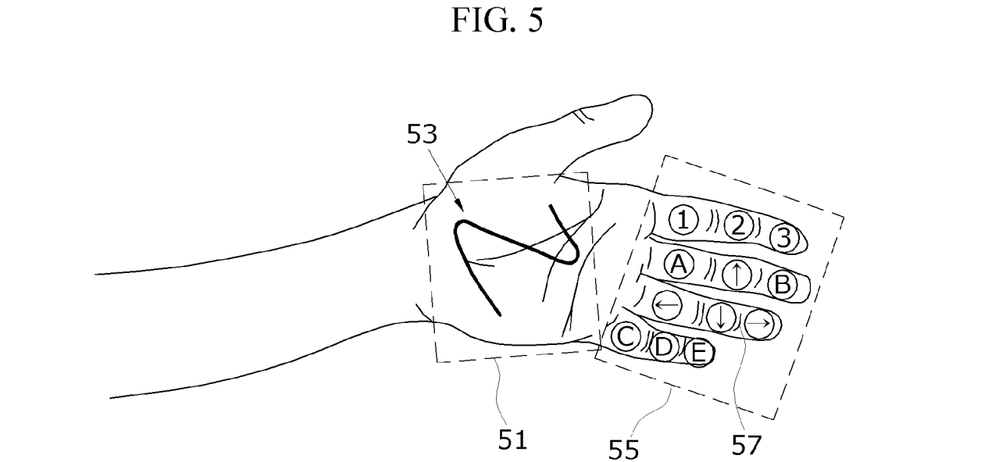

Referring to FIG. 5, the motion information about the input tool for inputting the specific pattern or the signature may be, for example, information indicating a motion of an input tool for inputting a specific pattern 53, which only the user remembers, to a virtual input area 51 which is set on a palm. The input tool may be a finger, a pen, a rod, or the like.

The motion information about the input tool for inputting the key may be, for example, information indicating a motion of an input tool for inputting a key, which only the user remembers, to a virtual input area 55 which is set (projected or overlaps) on a palm. Here, the virtual input area 55 set on the palm may be a virtual keypad.

When the virtual input area 55 is set on a finger, the virtual input area 55 may include twelve key input areas checked (or recognized) by a knuckle line 57 extracted from image data.

In FIG. 5, the virtual input area 55 is illustrated as being set on four fingers except a thumb, but the thumb may also be included in the virtual input area 55. In this case, two key input areas may be secured in the thumb by one knuckle line. Therefore, if the thumb is included in the virtual input area 55, the virtual input area 55 may include fourteen key input areas.

The virtual input area may be projected onto a palm or a finger by a head-mounted device (HMD) such as electronic glasses and may be recognized by the user.

Figure 6:
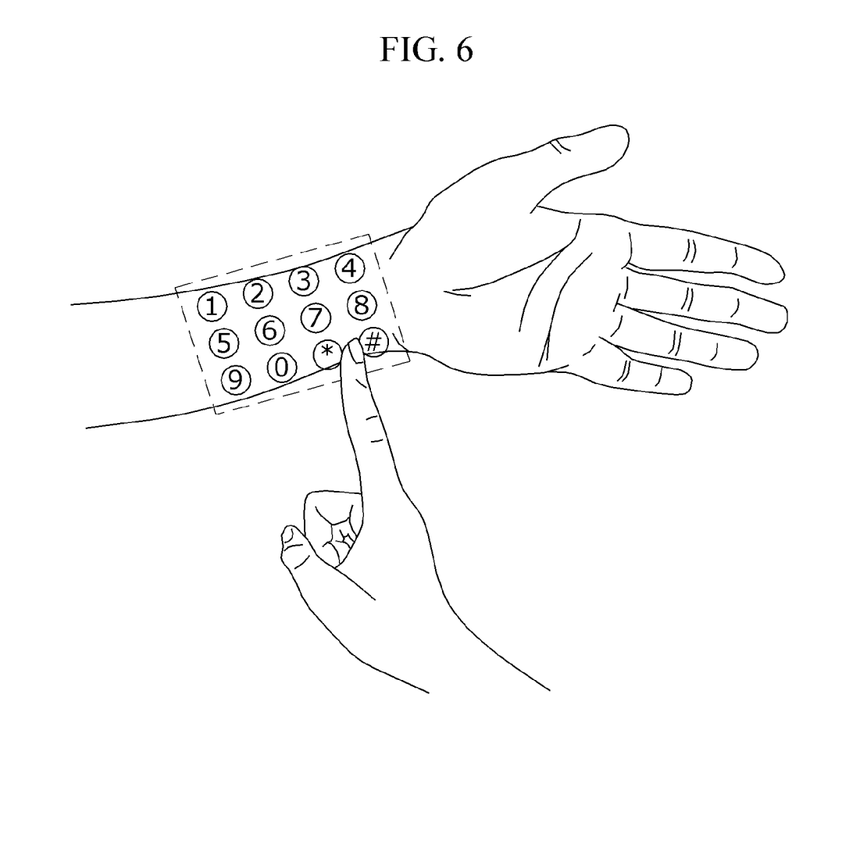
Figure 7:
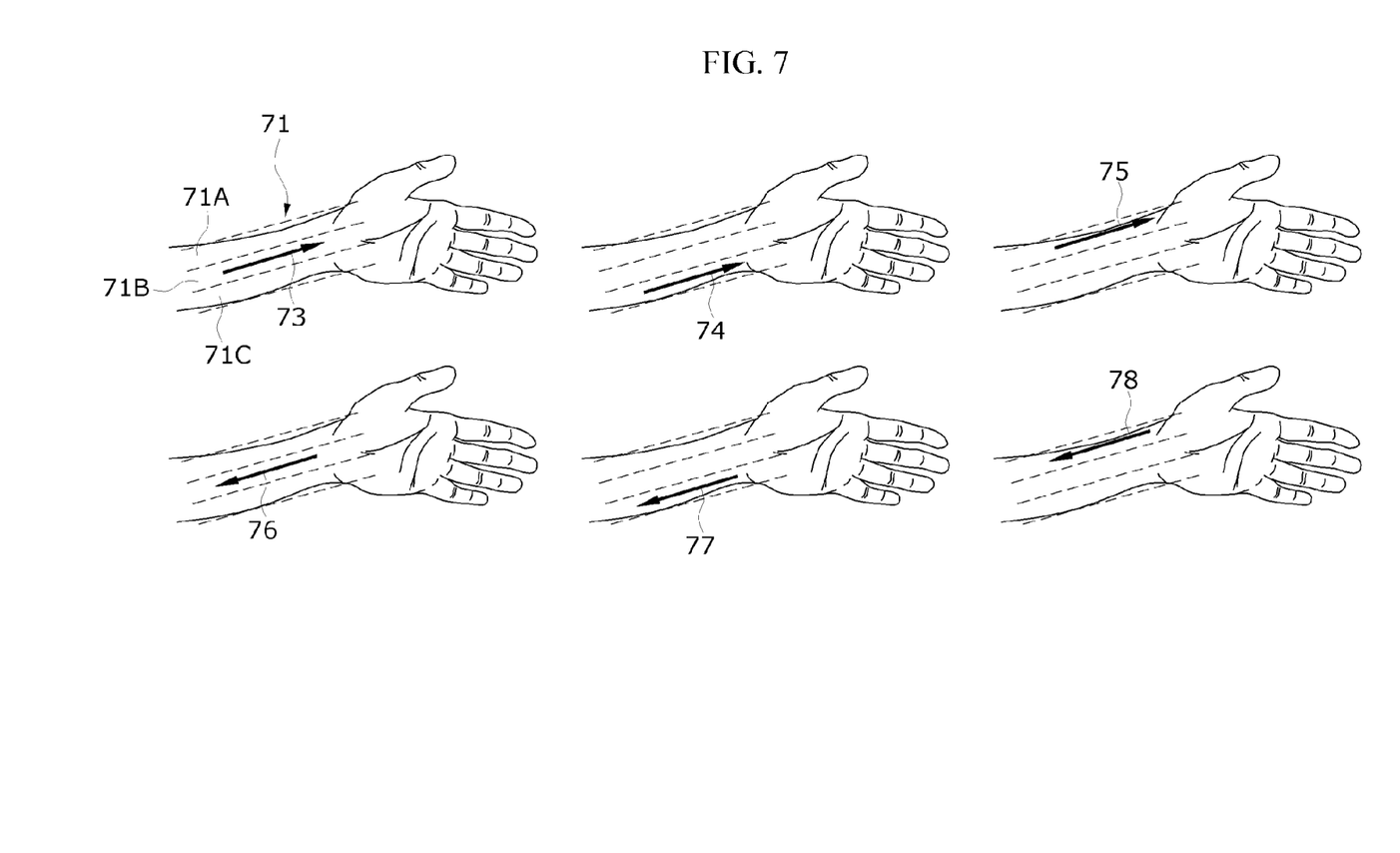
Figure 8:
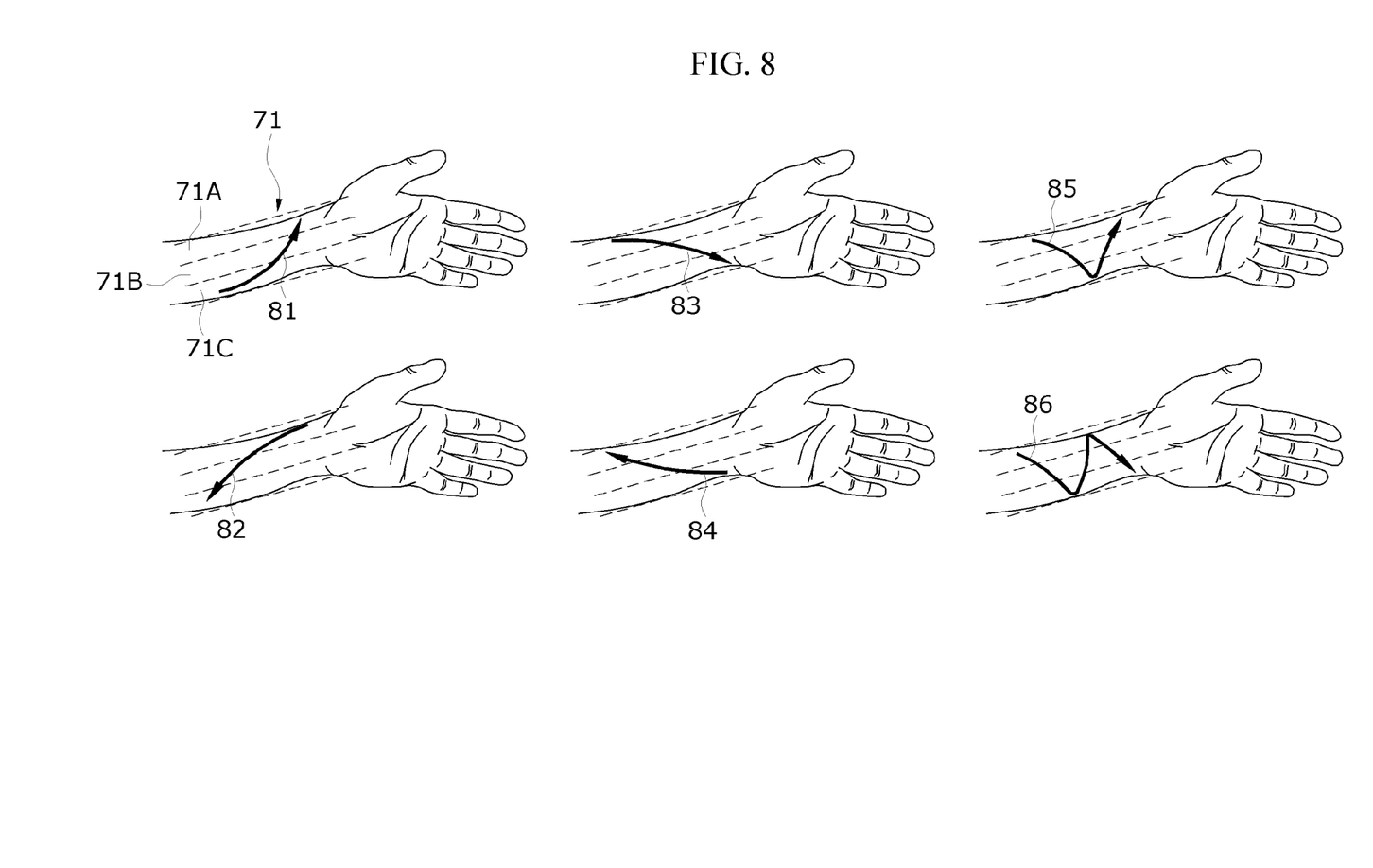

The virtual input area, as illustrated in FIGS. 6 to 8, may be set on a wrist in addition to a finger and a palm. The virtual input area may be a virtual keypad. The virtual keypad set (overlapped or projected) on a wrist may be provided as a virtual keypad including a number key and a special key "*" and "#", but may include a letter key.

As illustrated in FIGS. 7 and 8, the virtual input area set (overlapped or projected) on the wrist may be an area through which a specific pattern is input by an input tool (a finger, a pen, or the like).

When the specific pattern is input through the virtual input area set (projected) on the wrist, the virtual keypad may not be overlapped or projected on the wrist.

In order to input the specific pattern through the virtual input area set (projected) on the wrist, as illustrated in FIG. 7, the virtual input area may include an upper input area 71A, a lower input area 71C, and a middle input area 71B between the upper input area 71A and the lower input area 71C. In this case, the specific pattern may include a motion pattern 73 of an input tool which moves in a first direction in the middle input area 71B, a motion pattern 74 of an input tool which moves in the first direction in the lower input area 71C, and a motion pattern 75 of an input tool which moves in the first direction in the upper input area 71A. On the other hand, it is obvious that the specific pattern may include motion patterns 76 to 78 of an input tool which moves in a second direction opposite to the first direction.

Unlike FIG. 7 illustrating the specific pattern including a motion pattern of an input tool which moves in one direction in only one of the upper input area 71A, the middle input area 71B, and the lower input area 71C, FIG. 8 illustrates a specific pattern including a motion pattern of an input tool which moves in another direction in one of the upper input area 71A, the middle input area 71B, and the lower input area 71C.

For example, the specific pattern may include a motion pattern 81 of an input tool which moves in a direction from the lower input area 71C to the upper input area 71A, a motion pattern 82 of an input tool which moves a direction opposite thereto, a motion pattern 83 of an input tool which moves in a direction from the upper input area 71A to the lower input area 71C, a motion pattern 84 of an input tool which moves a direction opposite thereto, a motion pattern 85 of an input tool which moves in the direction from the upper input area 71A to the lower input area 71C and then moves in the direction from the lower input area 71C to the upper input area 71A, and a motion pattern 86 of an input tool which moves in the direction from the upper input area 71A to the lower input area 71C, subsequently moves in the direction from the lower input area 71C to the upper input area 71A, and again moves in the direction from the upper input area 71A to the lower input area 71C.

Figure 9:
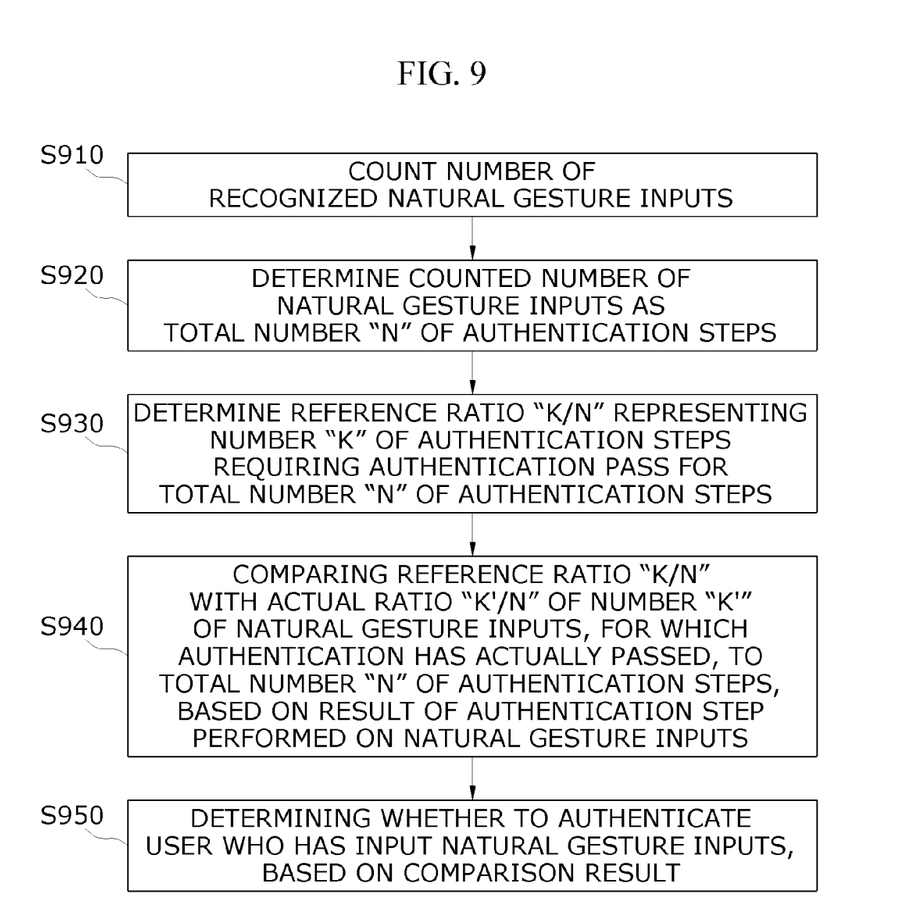
FIG. 9 is a flowchart illustrating a user authentication operation using a natural gesture input according to an embodiment of the present invention.

FIG. 9 is a flowchart illustrating a user authentication operation using a natural gesture input according to an embodiment of the present invention. In order to help understand description, FIG. 3 will be referred to together.

Referring to FIG. 9, first, in step S910, an operation of counting, by the natural gesture authentication processing unit, the number of natural gesture inputs classified by the gesture classifier (191 in FIG. 3) may be performed.

For example, the natural gesture inputs classified by the gesture classifier (191 in FIG. 3) may include an input representing a body feature, an input representing a body action of a user, an input representing a motion of an input tool which inputs a key, and an input representing a motion of an input tool which inputs a specific pattern (or a signature). If each of the inputs is configured as one input, the number of the natural gesture inputs may be four.

Subsequently, in step S920, an operation of determining the counted number of the natural gesture inputs as the total number "N" of authentication steps (where N is a natural number) may be performed. Assuming an example of the preceding step, since the number of the natural gesture inputs is four, the total number "N" of the authentication steps may be four.

Subsequently, in step S930, an operation of determining a reference ratio "K/N" representing the number "K" of authentication steps requiring authentication pass for the total number "N" of the authentication steps may be performed. The reference ratio "K/N" may be variously set by a user. As the number "K" of the authentication steps requiring authentication pass, set by the user, becomes higher, a security level may become higher. If the number "K" of the authentication steps requiring authentication pass is set to four by the user in an example of the preceding step, a security level may be set a maximum security level, and if the number "K" of the authentication steps requiring authentication pass is set to one by the user, a security level may be set a minimum security level.

Subsequently, in step S940, an operation of comparing the determined reference ratio "K/N" with an actual ratio "K'/N" of the number "K" of natural gesture inputs, for which authentication has actually passed, to the total number "N" of the authentication steps may be performed based on a result of the authentication step performed on the natural gesture inputs.

Subsequently, in step S950, an operation of determining whether to authenticate a user who has input the natural gesture inputs may be performed based on a result obtained by comparing the actual ratio "K'/N" with the reference ratio "K/N". For example, if the actual ratio "K'/N" is equal to or higher than the reference ratio "K/N", by determining a pass of authentication on the user who has input the natural gesture inputs, an access authority enabling the use of a system or a program may be allocated to the user, and if the actual ratio "K'/N" is lower than the reference ratio "K/N", by determining a fail of the authentication on the user, an access of the user to the system or the program may be blocked.

A reference ratio "G/N" lower than the reference ratio "K/N" which is set for the user may be set for another person (hereinafter referred to as a guest) other than the user. In this case, even when all authentications on the guest who has input natural gesture inputs passed based on the reference ratio "G/N" which is set lower than the reference ratio "K/N", an access authority which partially limits the use of the system or the program may be allocated to the guest.

Figure 10:
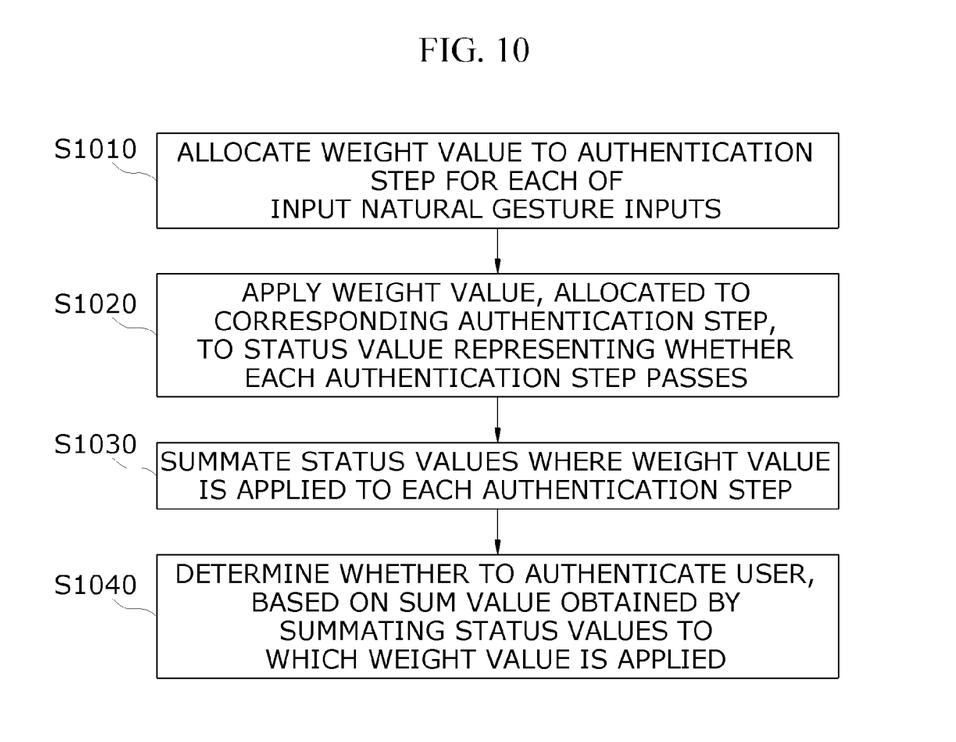
FIG. 10 is a flowchart illustrating a user authentication operation using a natural gesture input according to another embodiment of the present invention.

FIG. 10 is a flowchart illustrating a user authentication operation using a natural gesture input according to another embodiment of the present invention.

Referring to FIG. 10, in another embodiment of an authentication operation, a weight value may be applied to each of authentication steps on each of input natural gesture inputs, and thus, there is a difference between the embodiment of FIG. 10 and the embodiment of FIG. 9.

First, in step S1010, an operation of allocating a weight value to an authentication step for each of input natural gesture inputs may be performed.

A recognition rate of a natural gesture of a user may be reduced by an ambient environment (a dark illumination environment), surroundings (a situation where there are a number of motions of surrounding persons confusable with a motion of the user), or a situation (a situation where the user is injured) where the motion of the user is inconvenient. In this case, an authentication error for the user can occur.

Therefore, a low weight value may be allocated to an authentication step for a natural gesture input having a gesture recognition rate which is low due to the ambient environment, the surroundings, or the situation where the motion of the user is inconvenient, and a high weight value may be allocated to an authentication step for a natural gesture input having the gesture recognition rate which is relatively high, thereby efficiently performing an authentication operation on the user.

For example, since a motion of inputting a specific pattern and a body action should recognize a motion which is relatively more complicated than a motion of inputting a body feature and a key, a low weight value may be allocated to an authentication step for a natural gesture input including the motion of inputting the specific pattern and the body action, in comparison with the motion of inputting the body feature and the key. Accordingly, an influence of a body action and a specific pattern on user authentication is minimized, and thus, although an accurate body action and specific pattern are input, an authentication error where user authentication is determined as a fail is minimized.

Subsequently, in step S1020, an authentication operation on each of input natural gesture inputs may be performed, and an operation of applying a weight value, allocated to a corresponding authentication step, to a status value representing whether each authentication step passes may be performed. In a method of applying the weight value to the status value, there may be a multiplication operation, an addition operation, or a combination thereof. The status value may include 1 representing a pass of an authentication step and a value which is less than 1 and represents a fail of the authentication step, and the value which is less than 1 may include 0.

Subsequently, in step S1030, an operation of summating status values where the weight value is applied to each authentication step may be performed.

Subsequently, in step S1040, an operation of determining whether to authenticate the user may be performed based on a sum value obtained by summating the status values to which the weight value is applied. For example, a predetermined reference value may be compared with the sum value, and when the sum value is equal to or greater than the reference value, an access authority enabling the use of the system or the program by the user may be allocated by determining user authentication as a pass. Also, when the sum value is less than the reference value, an access of the user to the system or the program may be blocked by determining user authentication as a fail.

As described above, a method of allocating a weight value to each authentication step can minimize a user authentication error caused by a natural gesture authentication error which occurs due to an ambient environment or surroundings even when a user inputs an accurate natural gesture in some authentication steps.

Moreover, in the method of allocating a weight value to each authentication step, an input where a user intentionally inputs a wrong natural gesture may be permitted. This denotes that a security of system access is reinforced. For example, in a case where only a user can know a weight value assigned to each authentication step, if all authentication steps are configured with four operations, a user may input accurate natural gesture inputs to two authentication steps, to which high weight values are assigned, of four authentication steps and may intentionally input wrong natural gesture inputs to the other two authentication steps to which relatively low weight values are assigned, and thus, even when an operation of inputting, by the user, a natural gesture is exposed to the outside, an authorized user cannot know an accurate natural gesture input for accessing the system. In this case, by frequently changing a weight value allocated to each authentication step or frequently changing the order of authentication steps, security is further reinforced.

Figure 11A:
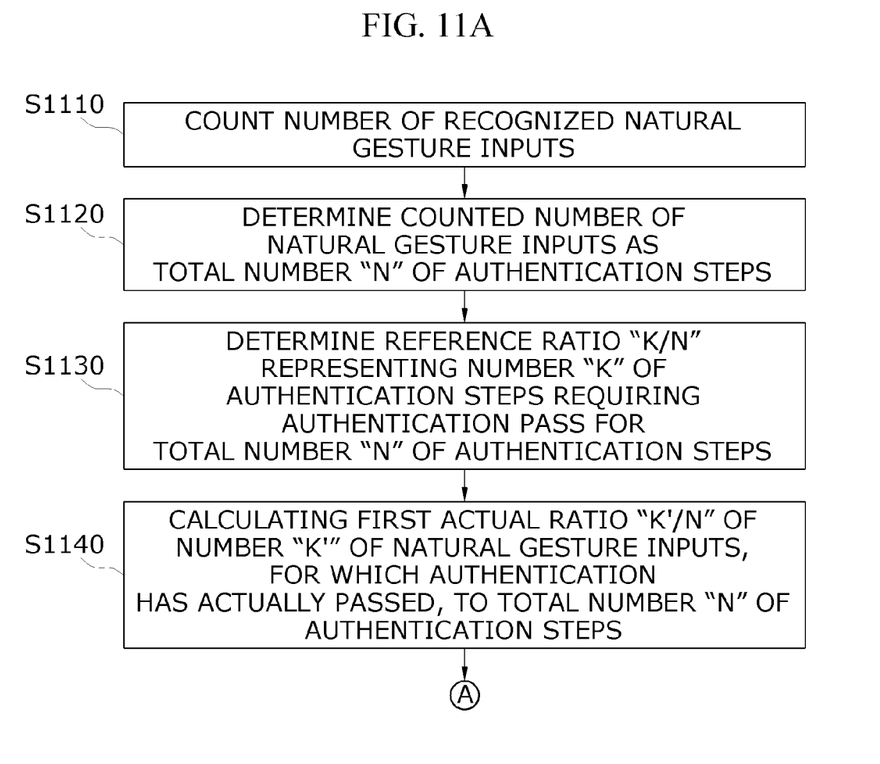
FIGS. 11A and 11B are a flowchart illustrating a user authentication operation using a natural gesture input according to another embodiment of the present invention.
Figure 11B:
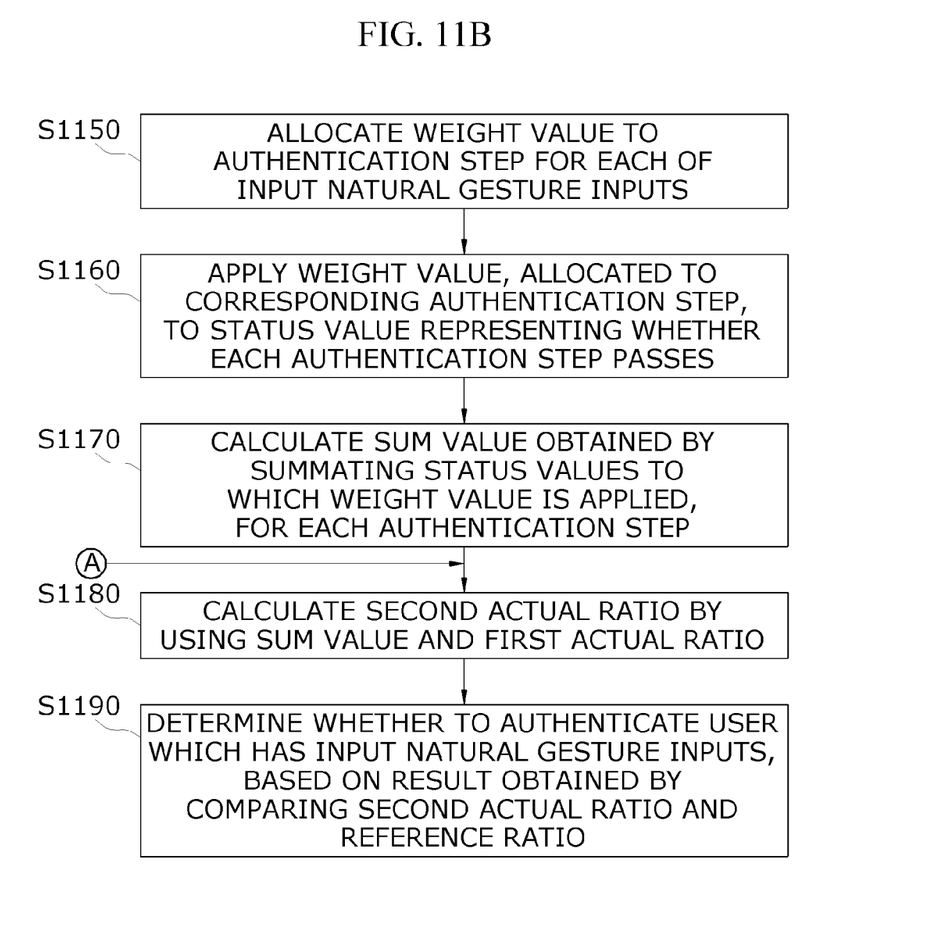

FIGS. 11A and 11B are a flowchart illustrating a user authentication operation using a natural gesture input according to another embodiment of the present invention.

An authentication operation according to another embodiment of the present invention may be a combination of the embodiment of FIG. 9 and the embodiment of FIG. 10 and may perform an authentication operation on each of natural gesture inputs, based on the predetermined reference ratio "K/N" and a weight value.

Referring to FIGS. 11A and 11B, first, in step S1110, an operation of counting, by the natural gesture authentication processing unit, the number of natural gesture inputs classified by the gesture classifier (191 in FIG. 3) may be performed.

Subsequently, in step S1120, an operation of determining the counted number of the natural gesture inputs as the total number "N" of authentication steps (where N is a natural number) may be performed.

Subsequently, in step S1130, an operation of determining a reference ratio "K/N" representing the number "K" of authentication steps requiring authentication pass for the total number "N" of the authentication steps may be performed.

Subsequently, in step S1140, an operation of calculating a first actual ratio "K'/N" of the number "K'" of natural gesture inputs, for which authentication has actually passed, to the total number "N" of the authentication steps may be performed.

Subsequently, in step S1150, an operation of allocating a weight value to an authentication step for each of input natural gesture inputs may be performed.

Subsequently, in step S1160, an operation of applying a weight value, allocated to a corresponding authentication step, to a status value representing whether authentication actually passes may be performed on each authentication step.

Subsequently, in step S1170, an operation of calculating a sum value obtained by summating the status values to which the weight value is applied may be performed on each authentication step.

Subsequently, in step S1180, an operation of calculating a second actual ratio by using the sum value and the first actual ratio which has been calculated in step S1140 may be performed. In a method of calculating the second actual ratio, there may be an addition operation of summating the sum value and the first actual ratio or a multiplication operation of multiplying the sum value and the first actual ratio.

Subsequently, in step S1190, an operation of determining whether to authenticate the user which has input the natural gesture inputs may be performed based on a result obtained by comparing the second actual ratio and the reference ratio. For example, when the second actual ratio is equal to or higher than the reference ratio, the authentication of the user may be determined as a pass, and otherwise, the authentication of the user may be determined as a fail.

As described above, in the present embodiment, by considering the predetermined reference ratio "K/N" and the weight value, security reinforced through the above-described embodiments is further reinforced.

A user authentication operation on non-natural gesture inputs may be the same as the user authentication operation according to the above-described embodiments, and there is a difference in that the non-natural gesture inputs are used instead of natural gesture inputs. That is, the number of the non-natural gesture inputs may be determined as the total number of authentication steps, and the user authentication operation illustrated in each of FIGS. 9 to 11 may be applied as-is, based on the determined total number of the authentications steps.

In various embodiments of the present invention, it has been described above that the processing units 193 and 197 (see FIG. 3) individually perform an authentication operation on a natural gesture input and an authentication operation on a non-natural gesture input, but the authentication operations may be performed by one processing units. In a modification embodiment, the natural gesture authentication processing unit 193 and the non-natural gesture authentication processing unit 197 illustrated in FIG. 3 may be illustrated as one block corresponding to "gesture authentication processing unit". In this case, the total number of authentication steps may be a sum of the number of natural gesture inputs and the number of non-natural gesture inputs, and the sum of the number of the natural gesture inputs and the number of the non-natural gesture inputs may be determined as the total number of the authentication steps, and the user authentication operation illustrated in each of FIGS. 9 to 11 may be modified based on the determined total number of the authentication steps.

According to the embodiments of the present invention, by performing a plurality of authentication steps on natural gesture inputs, a user authentication method robust to an ambient environment and surroundings is provided.

Moreover, according to the embodiments of the present invention, by providing a natural gesture-based user authentication method robust to an ambient environment and surroundings with a conventional image processing algorithm for recognizing a natural gesture, developments of an image processing algorithm for improving a natural gesture recognition rate are reduced, and the cost of the developments is reduced.

Moreover, according to the embodiments of the present invention, by assigning a weight value to each of authentication steps, a user authentication error frequently caused by a natural gesture input error is minimized, and moreover, by allowing a wrong natural gesture input, the security of system access is improved.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user authentication method, comprising:
recognizing natural gesture inputs from image data of a user;
determining a total number of gestures based on the recognized natural gesture inputs;
determining a reference ratio of a number of the gestures required to pass authentication to the total number of the gestures, wherein the reference ratio reflects a degree of security;
determining an actual ratio of a number of the gestures determined to pass authentication to the total number of the gestures; and
denying access of the user, in response to the actual ratio being lower than the reference ratio,
wherein the natural gesture inputs comprise any one or any combination of any two or more of an input representing a body feature of the user, an input representing a body action of the user, an input representing a motion of an input tool with which the user inputs a key, and an input representing a motion of an input tool with which the user inputs a specific pattern.

2. The user authentication method of claim 1, wherein the input representing the motion of the input tool with which the user inputs the key comprises an input representing the motion of the input tool in a virtual input area recognized through a knuckle line extracted from the image data.

3. The user authentication method of claim 1, wherein the input representing the motion of the input tool with which the user inputs a specific pattern comprises an input representing the motion of the input tool in a virtual input area displayed on a palm or a wrist of the user.

4. The user authentication method of claim 1, wherein in the input representing the body feature of the user, the body feature of the user comprises a shape of a nevus on a skin of the user, a skin color of the user, and a worn item put on a finger of the user.

5. The user authentication method of claim 1, further comprising: recognizing non-natural gesture inputs,
wherein the determining of the total number of the gestures comprises determining a sum of the number of the recognized natural gesture inputs and a number of the recognized non-natural gesture inputs as the total number of the gestures.

6. The user authentication method of claim 5, wherein the natural gesture inputs comprise optically detected motions of the user, and the non-natural gesture inputs comprise motions of the user detected on a screen.

7. The user authentication method of claim 1, further comprising determining that the user is authenticated, in response to the actual ratio being greater than or equal to the reference ratio.

8. The user authentication method of claim 1, wherein the denying access of the user comprises determining that authentication of the user failed, in response to the actual ratio being lower than the reference ratio.

9. The user authentication method of claim 1, wherein the reference ratio is set by the user.

10. A user authentication method, comprising:
recognizing natural gestures among gestures from image data of a user;
allocating weight values to authentication steps respectively corresponding to the recognized natural gestures, wherein the weight values are determined based on predicted recognition rates of natural gesture inputs;
applying the weight values to status values respectively representing whether the authentication steps pass authentication to generate weighted status values;
summating the weighted status values to obtain a summation value; and
denying access of the user, in response to the summation value being less than a reference value,
wherein recognition rates are predicted based on qualities of the natural gestures,
wherein the natural gesture inputs comprise any one or any combination of any two or more of an input representing a body feature of the user, an input representing a body action of the user, an input representing a motion of an input tool with which the user inputs a key, and an input representing a motion of an input tool with which the user inputs a specific pattern, and wherein the weight values are applied to generate an actual ratio of a number of the gestures passing authentication to a total number of the gestures.

11. The user authentication method of claim 10, further comprising: recognizing non-natural gestures among the gestures, wherein the authentication steps respectively correspond to the natural gestures and the non-natural gestures.

12. The user authentication method of claim 10, further comprising authenticating the user, in response to the summation value exceeding a threshold.

13. The user authentication method of claim 10, wherein the recognition rates are predicted based on any one or any combination of any two or more of an ambient environment of the user, surroundings of the user, and a situation of the user.

14. A user authentication system, comprising:

a processor configured to recognize natural gesture inputs from image data of a user, determine a total number of gestures based on the recognized natural gesture inputs, determine a reference ratio of a number of the gestures required to pass authentication to the total number of the gestures, wherein the reference ratio reflects a degree of security, determine an actual ratio of a number of the gestures determined to pass authentication to the total number of the gestures, and deny access of the user, in response to the actual ratio being lower than the reference ratio, wherein the natural gesture inputs comprise any one or any combination of any two or more of an input representing a body feature of the user, an input representing a body action of the user, an input representing a motion of an input tool with which the user inputs a key, and an input representing a motion of an input tool with which the user inputs a specific pattern.

15. The user authentication system of claim 14, wherein the processor comprises a gesture recognition module configured to recognize the natural gesture inputs from the image data of the user, and a natural gesture authentication processing unit configured to determine the total number of the gestures based on the recognized natural gesture inputs, determine the reference ratio of the number of the gestures required to pass authentication to the total number of the gestures, determine the actual ratio of the number of the gestures determined to pass authentication to the total number of the gestures, and deny access of the user, in response to the actual ratio being lower than the reference ratio.

16. The user authentication system of claim 15, wherein the natural gesture authentication processing unit is further configured to apply a weight value to generate the actual ratio.

17. The user authentication system of claim 16, wherein the natural gesture authentication processing unit is further configured to determine a summation value obtained by summating status values to which the weight value is applied.

18. The user authentication system of claim 15, wherein the natural gesture authentication processing unit is further configured to apply a weight value, allocated to a corresponding gesture, among the gestures, to a status value representing whether authentication passes for each of the gestures.

19. The user authentication system of claim 15, wherein the input representing the motion of the input tool with which the user inputs the key comprises an input representing the motion of the input tool in a virtual input area recognized through a knuckle line extracted from the image data.

20. The user authentication system of claim 15, wherein the input representing the motion of the input tool with which the user inputs the specific pattern comprises an input representing the motion of the input tool in a virtual input area displayed on a palm or a wrist of the user.

21. The user authentication system of claim 15, wherein in the input representing the body feature of the user, the body feature of the user comprises a shape of a nevus on a skin of the user, a skin color of the user, and a worn item put on a finger of the user.

* * * * *